(12) United States Patent
Cho et al.

(10) Patent No.: US 11,428,795 B2
(45) Date of Patent: Aug. 30, 2022

(54) METHOD AND DEVICE FOR COUNTING PEOPLE BY USING UWB RADAR

(71) Applicant: Industry-University Cooperation Foundation Hanyang University, Seoul (KR)

(72) Inventors: Sung Ho Cho, Seoul (KR); Jeong Woo Choi, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 82 days.

(21) Appl. No.: 16/959,836

(22) PCT Filed: Dec. 31, 2018

(86) PCT No.: PCT/KR2018/016979
§ 371 (c)(1),
(2) Date: Jul. 2, 2020

(87) PCT Pub. No.: WO2019/135580
PCT Pub. Date: Jul. 11, 2019

(65) Prior Publication Data
US 2020/0333449 A1    Oct. 22, 2020

(30) Foreign Application Priority Data
Jan. 2, 2018    (KR) .......................... 10-2018-0000250

(51) Int. Cl.
*G01S 13/04*    (2006.01)
*G01S 13/88*    (2006.01)
(52) U.S. Cl.
CPC .............. *G01S 13/04* (2013.01); *G01S 13/88* (2013.01)

(58) Field of Classification Search
CPC ........ G01S 13/56; G01S 13/88; G01S 13/888; G01S 13/04; G01S 13/723
(Continued)

(56) References Cited

U.S. PATENT DOCUMENTS 8,026,842 B2 *  9/2011  Fox ........................ G01S 7/2922
                                                        342/52
8,026,844 B2 *  9/2011  Fox ........................ G01S 13/867
                                                        342/173
(Continued)

FOREIGN PATENT DOCUMENTS

JP    5162030 B2    12/2012
JP    2014-191533 A    10/2014
(Continued)

OTHER PUBLICATIONS

Choi, Jeong Woo et al., Multi-human detection algorithm based on an impulse radio ultra-wideband radar system. IEEE Access. 2016., pp. 10300-10309.
(Continued)

*Primary Examiner* — Erin F Heard
*Assistant Examiner* — Michael W Justice
(74) *Attorney, Agent, or Firm* — Novick, Kim & Lee, PLLC; Jae Youn Kim

(57) ABSTRACT

Disclosed are a method and device for measuring a headcount by using a peak value distribution pattern of a radar reception signal according to the headcount. The method for counting people by using a UWB radar disclosed herein comprises: a step of computing, for each predetermined headcount, an amplitude probability density function based on the distance between a reflection point and a radar, by using a sample radar reception signal for the headcount; a step of calculating likelihood values with respect to the headcounts from a measured radio reception signal by using
(Continued)

the probability density function; and a step of determining a headcount corresponding to the largest likelihood value among the calculated likelihood values, as a final headcount with respect to the measured radar reception signal.

6 Claims, 5 Drawing Sheets

(58) Field of Classification Search
 USPC .......................................................... 342/27
 See application file for complete search history.

(56) References Cited

U.S. PATENT DOCUMENTS

| | | | | |
|---|---|---|---|---|
| 8,330,647 | B2* | 12/2012 | Fox ...................... | G01S 13/867 |
| | | | | 342/91 |
| 9,030,351 | B2* | 5/2015 | Fox ...................... | G01S 13/867 |
| | | | | 342/91 |
| 9,696,409 | B2* | 7/2017 | Fox ...................... | G01S 13/867 |
| 2009/0015460 | A1* | 1/2009 | Fox ...................... | G01S 13/886 |
| | | | | 342/53 |
| 2010/0283662 | A1* | 11/2010 | Fox ...................... | G01S 7/2922 |
| | | | | 342/53 |
| 2011/0001657 | A1* | 1/2011 | Fox ...................... | G01S 13/723 |
| | | | | 342/107 |
| 2014/0062757 | A1* | 3/2014 | Fox ...................... | G01S 13/723 |
| | | | | 342/52 |
| 2015/0282112 | A1* | 10/2015 | Bialer ................... | H04L 45/24 |
| | | | | 455/456.1 |
| 2016/0097839 | A1* | 4/2016 | Fox ...................... | G01S 13/522 |
| | | | | 342/52 |

FOREIGN PATENT DOCUMENTS

| | | |
|---|---|---|
| KR | 10-2014-0096910 A | 8/2014 |
| KR | 10-2015-0109884 A | 10/2015 |
| KR | 10-2016-0135070 A | 11/2016 |
| KR | 10-2017-0132391 A | 12/2017 |

OTHER PUBLICATIONS

Chan, Antoni B et al., Counting people with low-level features and Bayesian regression. IEEE Transactions on Image Processing. 2011., pp. 2160-2177.

Choi, Jeong Woo et al., "People Counting Based on an IR-UWB Radar Sensor", IEEE sensors Journal. Sep. 1, 2017, vol. 17, pp. 5717-5727. See pp. 5720-5723 and figures 1-3, 6.

H. Celik et al., "Towards a Robust Solution to People Counting," 2006 International Conference on Image Processing, Oct. 2006, pp. 2401-2404.

\* cited by examiner

METHOD AND DEVICE FOR COUNTING PEOPLE BY USING UWB RADAR

CROSS-REFERENCE TO RELATED APPLICATIONS

This application is a National Phase Application of PCT International Application No. PCT/KR2018/016979, which was filed on Dec. 31, 2018, and which claims priority from Korean Patent Application No. 10-2018-0000250 filed on Jan. 2, 2018. The disclosures of the above patent applications are incorporated herein by reference in their entirety.

BACKGROUND

1. Technical Field

The present invention relates to a method and device for counting people by using a UWB radar, more particularly to a method and device for measuring a headcount by using peak distribution patterns of radar-received signals that are obtained according to headcount.

2. Description of the Related Art

UWB refers to radio technology in which a frequency band of 500 MHz or higher is used or the value defined as the fractional bandwidth is 25% or higher. A fractional bandwidth refers to a bandwidth of a signal relative to a center frequency. That is, UWB refers to radio technology that uses a wideband frequency and provides various advantages such as high range resolution, permeability, strong resistance to narrowband noise, and coexistence with other frequency-sharing devices.

IR-UWB (impulse-radio ultra-wideband) radar (hereinafter referred to as UWB radar) technology utilizes a system that combines a radar with such UWB technology and refers to radar technology in which impulse signals of a very short duration having wideband properties are transmitted, reflected off objects and persons, and returned, where the returned signals are received and used to perceive the surrounding circumstances.

A UWB radar system may generate impulse signals having a time width of several nanoseconds to several picoseconds at a signal generator unit and emit the impulse signals through a transmission antenna in a wide-angle or narrow-band angle. The emitted signals may be reflected off various objects or persons in the environment, and the reflected signals may pass through the receiver antenna and an ADC to be converted into digital signals.

Due to the advantages of the UWB radar described above, research is under way in numerous fields for utilizing the UWB radar. Current research efforts for technology developments are conducted in various fields, including medical devices for measuring breathing rates, pulse rates, etc., portable radar devices for lifesaving efforts in disaster areas, headcount devices for counting the number of people within a certain area, and the like. One such example is shown in Korean Registered Patent No. 10-1582404.

Measuring a headcount using a UWB radar may use the peak values of the radar-received signals. For instance, the headcount may be measured according to the number of peak values that exceed a threshold value. However, this method may not provide a high level of reliability, as the detection may frequently yield peak values that exceed the headcount, depending on the properties of the environment in which the people are present, and may yield different headcount measurement results according to which value the threshold is selected as.

As such, there is a need for a method that can measure a headcount with greater accuracy.

SUMMARY OF THE INVENTION

The present invention aims to provide a method and device for counting people with a UWB radar by using a peak distribution pattern of the radar-received signals obtained according to headcount.

An embodiment of the present invention, conceived to achieve the objective above, may provide a method for counting people by using a UWB radar that includes: computing a probability density function by using sample radar-received signals for each of predetermined headcounts, where the computing includes computing a probability density function for an amplitude associated with a distance between a reflection point and a radar for each of the headcounts; calculating likelihood values for the headcounts from measured radar-received signals by using the probability density functions; and determining a final headcount for the measured radar-received signals as a headcount corresponding to a highest likelihood value from among the calculated likelihood values.

Another embodiment of the present invention, conceived to achieve the objective above, may provide a device for counting people by using a UWB radar that includes: a probability density function computation unit configured to compute a probability density function by using sample radar-received signals for each of predetermined headcounts, where the probability density function computation unit computes a probability density function for an amplitude associated with a distance between a reflection point and a radar for each of the headcounts; and a headcount prediction unit configured to calculate likelihood values for the headcounts from measured radar-received signals by using the probability density functions and configured to predict a headcount for the measured radar-received signals by using the likelihood values.

According to the present invention, it is possible to measure the number of people present in a particular space with greater accuracy by generating sample data beforehand that reflect the peak distribution patterns of radar-received signals according to various headcounts and then measuring a headcount by using such sample data.

Also, according to the present invention, there is no need to set a threshold value, so that errors in measuring headcounts which may occur due to the setting of the threshold value can be prevented.

DETAILED DESCRIPTION OF THE INVENTION

Figure 1:
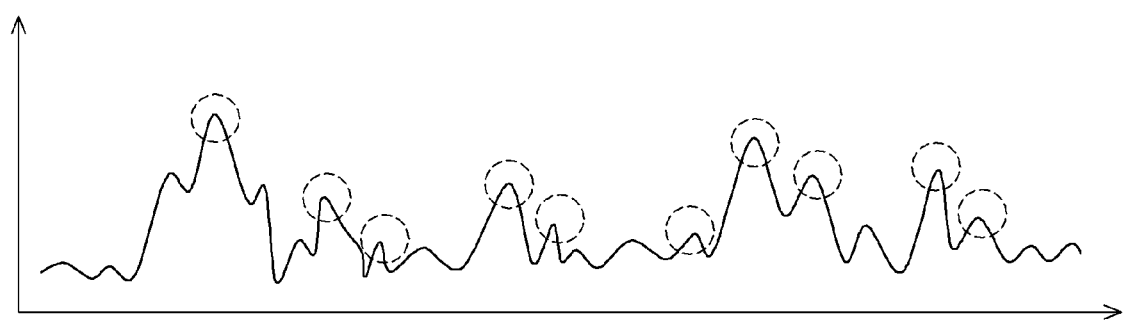
FIG. 1 is a graph illustrating UWB radar-received signals.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, similar reference numerals are used for similar elements.

Certain embodiments of the present invention are described below in more detail with reference to the accompanying drawings.

FIG. 1 is a graph illustrating UWB radar-received signals.

In FIG. 1, the X axis represents the time at which the signals transmitted from a UWB radar and reflected off targets, such as people, etc., were received, while the Y axis represents the amplitude of the received signals. Since the received times of the received signals are dependent on the distances between the reflection points of the objects and the UWB radar, the received times may correspond with the distances between the reflection points and the radar. Also, the peaks of the received signals can be created by targets such as persons or objects, etc.

Therefore, it can be said that the number of peaks in the received signals may reflect the number of objects present in the radar transmission area and that the received times of the peaks represent the distances between the reflection points and the radar. For instance, if there are five peak values that are greater than or equal to a threshold value in the radar-received signals of a particular space, then this can be regarded as there being five people at distances from the radar corresponding to the times at which the peaks are detected within the particular space.

As described above, however, since such peaks can be created not only by people but also by objects, etc., it may be difficult to measure a headcount by assuming a 1:1 relation between the number of peaks and the number of people. Thus, the present invention proposes a method and device for measuring headcount by using the peak distribution patterns of sample radar-received signals for each of a predetermined set of headcounts.

The present invention may first obtain sample radar-received signals with people arranged within a particular space according to a variety of set headcounts and may perform fitting for the peak distribution patterns of the obtained sample radar-received signals with probabilities. Then, in the actual measurement stage, likelihood values may be calculated for headcounts from measured radar-received signals obtained for the particular space, and the headcount for the measured radar-received signals may be determined.

If there are various objects within such a space, the signal properties affected by the objects may be incorporated in both the probability fitting step and the actual measurement step, so that the occurrence of errors caused by objects, etc., in the measuring of the headcount can be prevented.

Ultimately, the present invention can generate sample data that reflects the peak distribution patterns of radar-received signals for various headcounts beforehand and use this sample data to measure a headcount, whereby the number of people present in a particular space can be measured with greater accuracy.

Also, according to the present invention, there is no need to set a threshold value, so that errors in measuring headcounts that may otherwise occur due to the setting of the threshold value can be prevented.

The signals in FIG. 1 are signals in which the radar-received signals are illustrated in the form of an envelope line, and since peaks in actual received signals can appear due to objects, etc., as well as due to noise, etc., an embodiment of the present invention may detect peaks in units of predetermined detection segments, i.e. clusters, for use in measuring headcounts. The breadth of a detection segment can vary according to embodiment, and the determined clusters can vary according to the breadth of the detection segment, i.e. the resolution. FIG. 1 illustrates an example of ten clusters selected in order of largest magnitude of peak value, where the clusters are marked by red dotted lines.

Depending on the embodiment, it is possible to measure headcounts by determining a predetermined number of peaks in order of largest peak value rather than by determining clusters.

Figure 2:
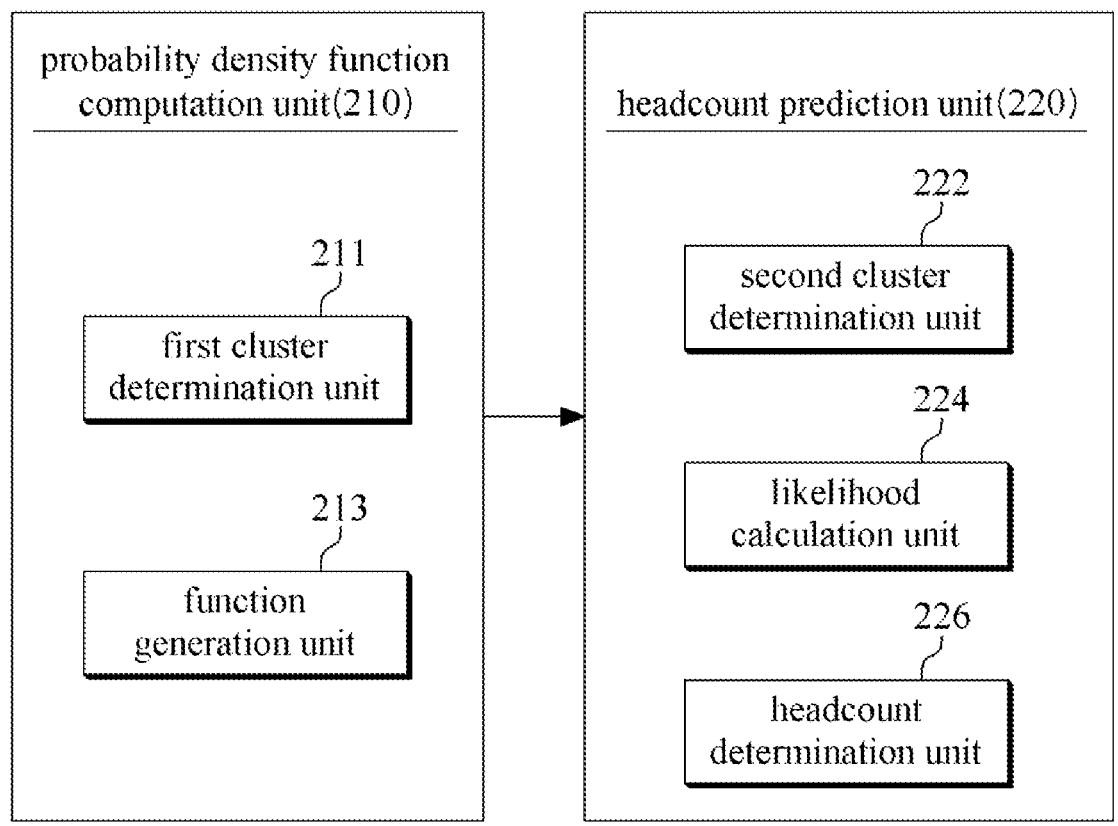
FIG. 2 is a diagram illustrating a device for counting people by using a UWB radar according to an embodiment of the present invention.

FIG. 2 is a diagram illustrating a device for counting people by using a UWB radar according to an embodiment of the present invention.

Referring to FIG. 2, a device for counting people by using a UWB radar based on the present invention may include a probability density function computation unit 210 and a headcount prediction unit 220. Also, depending on the embodiment, the probability density function computation unit 210 can include a first cluster determination unit 211 and a function generation unit 213, and the headcount prediction unit 220 can include a second cluster determination unit 222, a likelihood calculation unit 224, and a headcount determination unit 226.

The probability density function computation unit 210 may use sample radar-received signals for each of a predetermined set of headcounts to compute a probability density function for amplitude associated with the distance between the reflection points and the radar for each of the headcounts. For instance, sample radar-received signals can be obtained for each case from the headcount being 0 to the headcount being 9, and the probability density function computation unit 210 can compute the probability density function for each of the ten sets of sample radar-received signals.

The first cluster determination unit 211 may determine a predetermined number of first clusters including peak values from the sample radar-received signals for each of the predetermined headcounts. For instance, the first cluster determination unit 211 can determine ten clusters for each set of sample radar-received signals as illustrated in FIG. 1, where the clusters can be determined in order of largest magnitude of peak value.

The function generation unit 213 can generate a probability density function for amplitude associated with the distance between the reflection points and the radar for each first cluster and can generate the probability density function for each headcount by multiplying the probability density function generated for each first cluster. The method of generating the probability density functions will be described in greater detail with reference to FIG. 3.

The headcount prediction unit 220 may use the probability density functions computed at the probability density function computation unit 210 to calculate a likelihood value for each headcount with respect to the measured radar-received signals and to predict the headcount for the measured radar-received signals by using the likelihood values. The headcount prediction unit 220 can determine the final headcount for the measured radar-received signals as the headcount corresponding to the highest likelihood value from among the calculated likelihood values.

If probability density functions have been computed for 0 to 9 people as in the example described above, the headcount prediction unit 220 can calculate the likelihood values for headcounts ranging from 0 to 9 through the probability density functions and determine the final headcount as the headcount corresponding to the highest likelihood value.

The second cluster determination unit 222 may determine second clusters, in a number tantamount to the number of first clusters, from the measured radar-received signals.

The likelihood calculation unit 224 may use the probability density functions to calculate likelihood values for the headcounts from the maximum peak value and the distance value between the reflection point and the radar corresponding to the maximum peak value in each of the second clusters.

The headcount determination unit 226 may determine the final headcount for the measured radar-received signals as the headcount corresponding to the highest likelihood value from among the calculated likelihood values.

Figure 3:
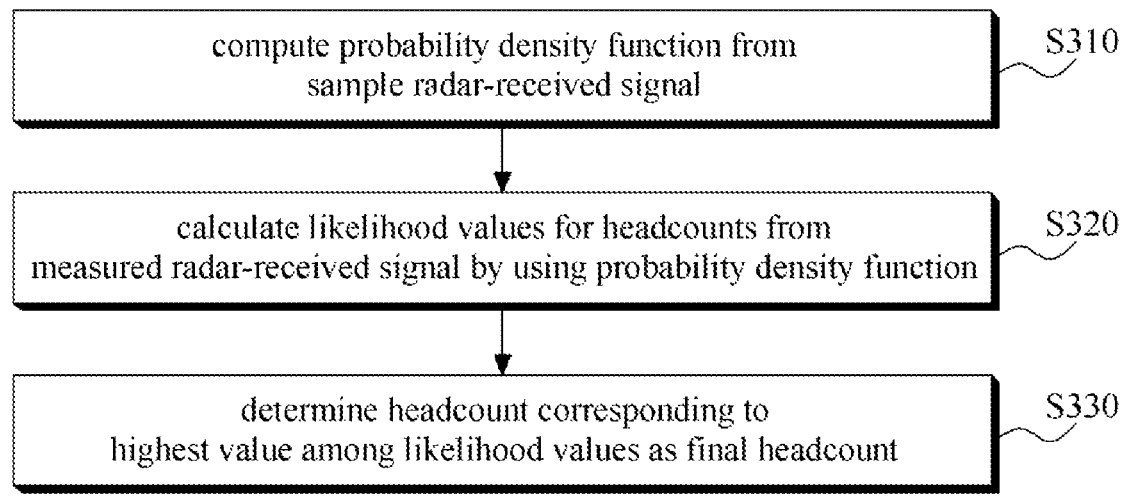
FIG. 3 is a diagram illustrating a method for counting people by using a UWB radar according to an embodiment of the present invention.
Figure 4:
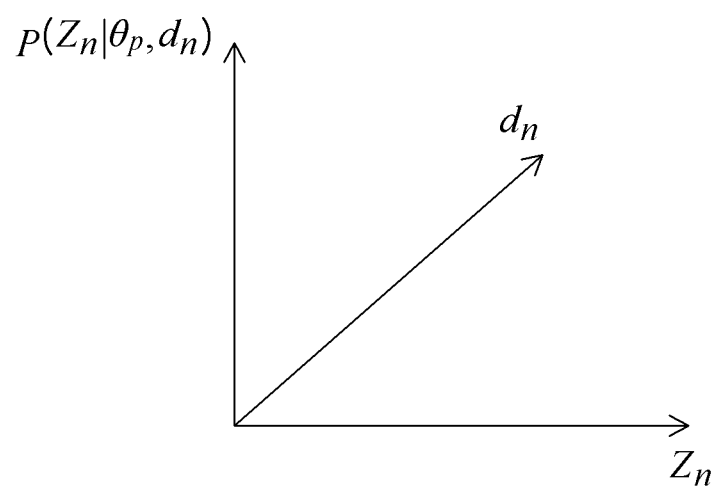
FIG. 4 is a diagram illustrating a probability distribution according to an embodiment of the present invention.

FIG. 3 is a diagram illustrating a method for counting people by using a UWB radar according to an embodiment of the present invention, and FIG. 4 is a diagram illustrating a probability distribution according to an embodiment of the present invention.

A method of counting people based on the present invention can be performed at a computing device including a processor, and the following describes an embodiment of a method of counting people performed by a device for counting people.

A device for counting people based on the present invention may compute a probability density function for amplitude, associated with the distance between the reflection point and the radar, for each headcount by using sample radar-received signals obtained for each of a predetermined set of headcounts (S310). That is, with people arranged according to a predetermined headcount in a particular space, such as in an elevator for instance, radar signals may be transmitted and received, and probability density functions may be computed from the sample radar-received signals thus obtained.

Then, using the probability density functions, likelihood values for headcounts may be calculated from measured radar-received signals (S320), and the headcount corresponding to the highest likelihood value from among the calculated likelihood values may be determined as the final headcount for the measured radar-received signals (S330).

In step S310, the device for counting people may determine a predetermined number of first clusters from the sample radar-received signals for each of the predetermined set of headcounts and, for each first cluster, may compute a probability density function for the amplitude associated with the distance between the reflection point and the radar.

A probability density function can, in one example, be a probability density function that represents a log normal distribution, in which case the probability density function $p(Z_n|\theta_p, d_n)$ can be computed as in [Equation 1].

$$p(Z_n|\theta_p, d_n) = \frac{1}{Z_n \sigma_n(\theta_p, d_n)\sqrt{2\pi}} \times \left\{ \exp\left(-\frac{(\ln Z_n - \mu_n(\theta_p, d_n))^2}{2\sigma_n^2(\theta_p, d_n)}\right) \right\}.$$

[Equation 1]

-continued $$\text{where } \mu_n(\theta_p, d_n) = \ln\left(\frac{m_n(\theta_p, d_n)}{\sqrt{1 + v_n(\theta_p, d_n)/m_n^2(\theta_p, d_n)}}\right)$$

$$\text{and } \sigma_n(\theta_p, d_n) = \sqrt{\ln\left(1 + \frac{v_n(\theta_p, d_n)}{m_n^2(\theta_p, d_n)}\right)}.$$

Here, $\theta_p$ represents the headcount, and $d_n$ represents the distance between the reflection point and the radar. Also, $\sigma_n$ represents a standard deviation, $m_n$ represents a mean, $v_n$ represents a variance, n represents a number of the cluster, where, as in a probability density function, the standard deviation, mean, and variance in [Equation 1] are the standard deviation, mean, and variance for amplitude associated with distance and are calculated for each of the headcounts. It can be said that [Equation 1] represents the probability distribution of amplitude $Z_n$ for the n-th cluster found at a distance of $d_n$ when there are a $\theta_p$ number of people present.

In other words, the probability density function may be a function that represents the probability distribution of amplitude in a 3-dimensional space as illustrated in FIG. 4. For each cluster and for each headcount, a probability distribution of amplitude in a 3-dimensional space such as that in FIG. 4 may be generated.

Returning again to FIG. 3, since the determined clusters do not overlap one another, the amplitude $Z_n$, which is a probability variable (random variable), for each cluster is independent of one another. Therefore, depending on the embodiment, the device for counting people can compute the probability density function for each headcount by multiplying the probability density function computed for each first cluster as in [Equation 2]. That is, probability density functions that reflect the probability distribution of amplitude for the multiple clusters determined for each headcount may be computed for each headcount.

$$p(Z|\theta_p, D) = \prod_{n=1}^{N_c} p(Z_n|\theta_p, d_n)$$

[Equation 2]

$$= \prod_{n=1}^{N_c} \frac{1}{Z_n \sigma_n(\theta_p, d_n)\sqrt{2\pi}} \times$$

$$\exp\left(-\frac{(\ln Z_n - \mu_n(\theta_p, d_n))^2}{2\sigma_n^2(\theta_p, d_n)}\right)$$

Here, $N_c$ represents the total number of clusters.

In step S320, the device for counting people may determine second clusters in a number tantamount to the number of first clusters from the measured radar-received signals and, using the probability density functions, may calculate likelihood values for the headcounts from the highest peak value and the distance value between the reflection point and the radar corresponding to the highest peak value in each of the second clusters.

As illustrated in FIG. 4, since a probability density function represents the probability distribution of amplitude associated with the distances between the reflection points and the radar, the likelihood value for each headcount with respect to the measured radar-received signals can be obtained by applying the highest peak value, i.e. amplitude, and the received time represented by the highest peak value, i.e. the distance value, of each second cluster into the probability density function for each headcount.

The magnitude of a likelihood value can be regarded as representing how similar the cluster distribution pattern of the measured radar-received signals is to the cluster distribution pattern of the sample radar-received signals for a certain headcount, and therefore, the device for counting people may determine the headcount corresponding to the highest likelihood value from among the calculated likelihood values as the final headcount for the measured radar-received signals.

Figure 5:
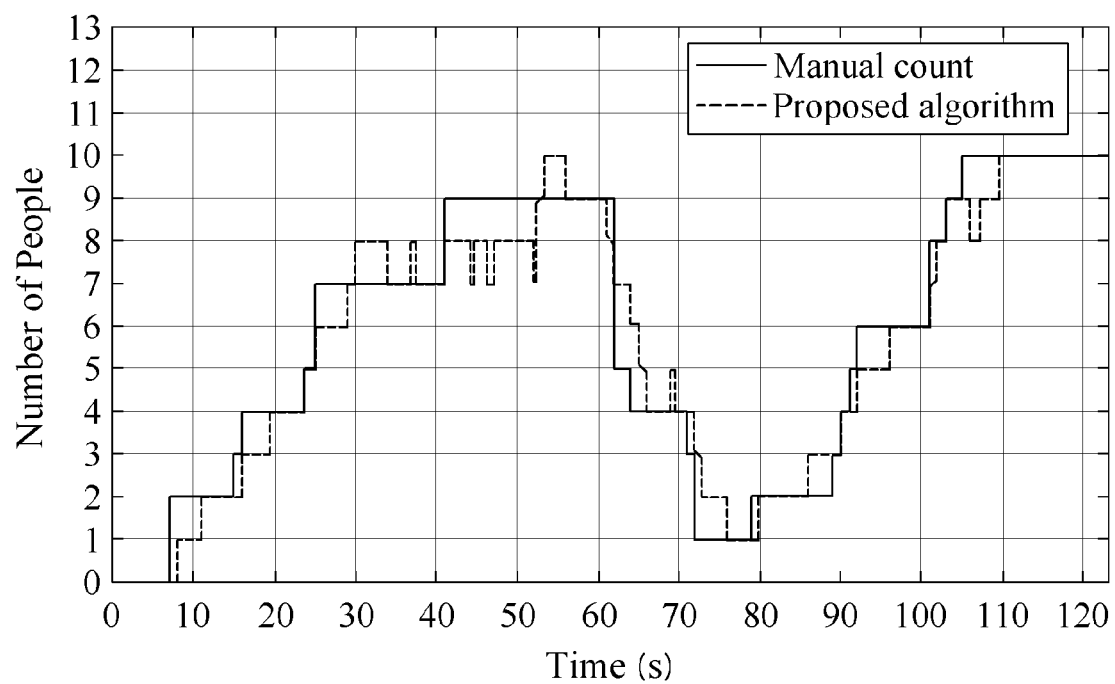
FIG. 5 is a diagram illustrating the results of measuring a headcount according to an embodiment of the present invention.

FIG. 5 is a diagram illustrating the results of measuring a headcount according to an embodiment of the present invention.

FIG. 5 is a diagram illustrating the results obtained after installing a UWB radar in an elevator and measuring the headcount, where the results are compared with the results of manually counting the number of people on board the elevator (Manual count).

Referring to FIG. 5, it can be seen that, even though the number of people on board the elevator changes in real time, the present invention can accurately measure the headcount in real time and provide measurement results that are very similar to the actual headcount.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., configured specially for storing and executing program instructions. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention is described above by way of limited embodiments and drawings that refer to particular details such as specific elements, etc., these are provided only to aid the general understanding of the present invention. The present invention is not to be limited by the embodiments above, and the person having ordinary skill in the field of art to which the present invention pertains would be able to derive numerous modifications and variations from the descriptions and drawings above. Therefore, it should be appreciated that the spirit of the present invention is not limited to the embodiments described above. Rather, the concepts set forth in the appended scope of claims as well as their equivalents and variations are encompassed within the spirit of the present invention.

What is claimed is:

1. A method for counting people by using an ultra-wideband (UWB) radar, the method comprising the steps of:
emitting signals and receiving reflected signals via the UWB radar;
computing a probability density function for an amplitude associated with a distance between a reflection point and the UWB radar for each of predetermined headcounts by using sample radar-received signals transmitted from the UWB radar for each of the predetermined headcounts;
calculating likelihood values for the headcounts from measured radar-received signals transmitted from the UWB radar by using the probability density function; and
determining a final headcount for the measured radar-received signals, the final headcount corresponding to a highest likelihood value from among the calculated likelihood values, wherein the computing of the probability density function for each of the predetermined headcounts comprises:
determining a predetermined number of first clusters from the sample radar-received signals for each of the predetermined headcounts, the first clusters including peak values; computing a probability density function for an amplitude associated with a distance between a reflection point and the UWB radar for each of the first clusters, and
computing the probability density function for each of the predetermined headcounts by multiplying the probability density functions for each of the first clusters.

2. The method for counting people by using the UWB radar according to claim 1, wherein the calculating of the likelihood values comprises:
determining second clusters from the measured radar-received signals, the second clusters determined in a number tantamount to the predetermined number of the first clusters; and
calculating the likelihood values by using the probability density function for each of the predetermined headcounts from a maximum peak value and a distance value between the reflection point and the UWB radar corresponding to the maximum peak value in each of the second clusters.

3. The method for counting people by using the UWB radar according to claim 2, wherein the first and second clusters are determined in order of a largest magnitude of peak values of the sample radar-received signals.

4. The method for counting people by using the UWB radar according to claim 1, wherein the computing of the probability density function for each of the headcounts represents a log normal distribution.

5. A device for counting people, the device comprising:
an ultra-wideband (UWB) radar configured to emit signals and receive reflected signals;
an ultra-wideband (UWB) radar configured to emit signals and receive reflected signals;
a probability density function computation processor configured to compute a probability density function for an amplitude associated with a distance between a reflection point and the UWB radar for each of predetermined headcounts by using sample radar-received signals transmitted from the UWB radar for each of the predetermined headcounts; and
a headcount prediction processor configured to calculate likelihood values for the headcounts from measured radar-received signals transmitted from the UWB radar by using the probability density function and configured to predict a headcount for the measured radar-received signals by using the likelihood values,
wherein the probability density function computation processor comprises a first cluster determination processor configured to determine a predetermined number of first clusters from the sample radar-received signals for each of the predetermined headcounts, the first clusters including peak values; and
a function generation processor configured to compute a probability density function for an amplitude associated with a distance between a reflection point and the UWB radar for each of the first clusters and to compute the probability density function for each of the predetermined headcounts by multiplying the probability density functions for each of the first clusters.

6. The device for counting people by using the UWB radar according to claim 5, wherein the headcount prediction processor comprises:
a second cluster determination processor configured to determine second clusters from the measured radar-received signals, the second clusters determined in a number tantamount to the predetermined number of the first clusters;
a likelihood calculation processor configured to calculate the likelihood values by using the probability density function for each of the predetermined headcounts from a maximum peak value and a distance value between the reflection point and the UWB radar corresponding to the maximum peak value in each of the second clusters; and
a headcount determination processor configured to determine a final headcount for the measured radar-received signals corresponding to a highest likelihood value from among the calculated likelihood values.

* * * * *